United States Patent [19]
Webber

[11] Patent Number: 5,755,179
[45] Date of Patent: May 26, 1998

[54] APPARATUS FOR PREVENTING BIRDS FROM PERCHING

[76] Inventor: Daniel Lee Webber, 6652 C E. Primrose Dr., United States Air Force Academy, Colo. 80840

[21] Appl. No.: 768,238

[22] Filed: Dec. 17, 1996

[51] Int. Cl.⁶ .................................................. A01K 39/01
[52] U.S. Cl. ............................................. 119/57.8
[58] Field of Search ........................ 119/57.9, 57.8, 119/63, 59, 464, 469

[56] References Cited

U.S. PATENT DOCUMENTS

| | | | |
|---|---|---|---|
| 2,485,148 | 10/1949 | Fralin. | |
| 3,083,687 | 4/1963 | Slaven | 119/57.8 X |
| 3,654,904 | 4/1972 | Krueger | 119/469 |
| 3,919,977 | 11/1975 | Clark | 119/464 |
| 4,867,104 | 9/1989 | Vandiver | 119/57.9 |
| 4,974,546 | 12/1990 | Burgett | 119/469 |
| 5,058,335 | 10/1991 | Richter | 119/59 X |
| 5,207,180 | 5/1993 | Graham | 119/52.3 |
| 5,293,721 | 3/1994 | Richard et al. | 52/101 |
| 5,497,585 | 3/1996 | Engler | 52/101 |

FOREIGN PATENT DOCUMENTS

| | | |
|---|---|---|
| 2507058 | 6/1981 | France. |
| 4021457 | 1/1992 | Germany. |
| 4135431 | 5/1992 | Japan. |
| 0018895 | 8/1906 | United Kingdom. |
| 0106926 | 6/1917 | United Kingdom. |
| 0693139 | 6/1953 | United Kingdom. |

*Primary Examiner*—Gene Mancene
*Assistant Examiner*—Yvonne R. Abbott
*Attorney, Agent, or Firm*—Linda Flewellen Gould

[57] ABSTRACT

An apparatus for preventing birds from perching utilizes a rectangular flat plate suspended by a rod inserted lengthwise through the plate or two rods inserted into opposite sides of the plate. The rod or rods are intentionally inserted along a horizontal axis which is not the center of the plate, so that the plate rotates eccentrically around that axis. Thus, although the plate rotates freely around the axis, the plate will rest with a smaller section above the axis and a larger section beneath the axis, unless it is disturbed. If a bird attempts to land on the plate, the added weight will swing the plate around the axis, throwing the bird off the plate and preventing the bird from perching. This device is particularly useful when mounted around the perimeter of a birdfeeder, forcing the bird to fly over the anti-perching device and feed from a location around a seed tray inside the feeder. A residue tray can then be located under the seed tray, extending outward to cover the area beneath the seed tray and its perimeter, to collect any offal falling as birds feed.

17 Claims, 2 Drawing Sheets

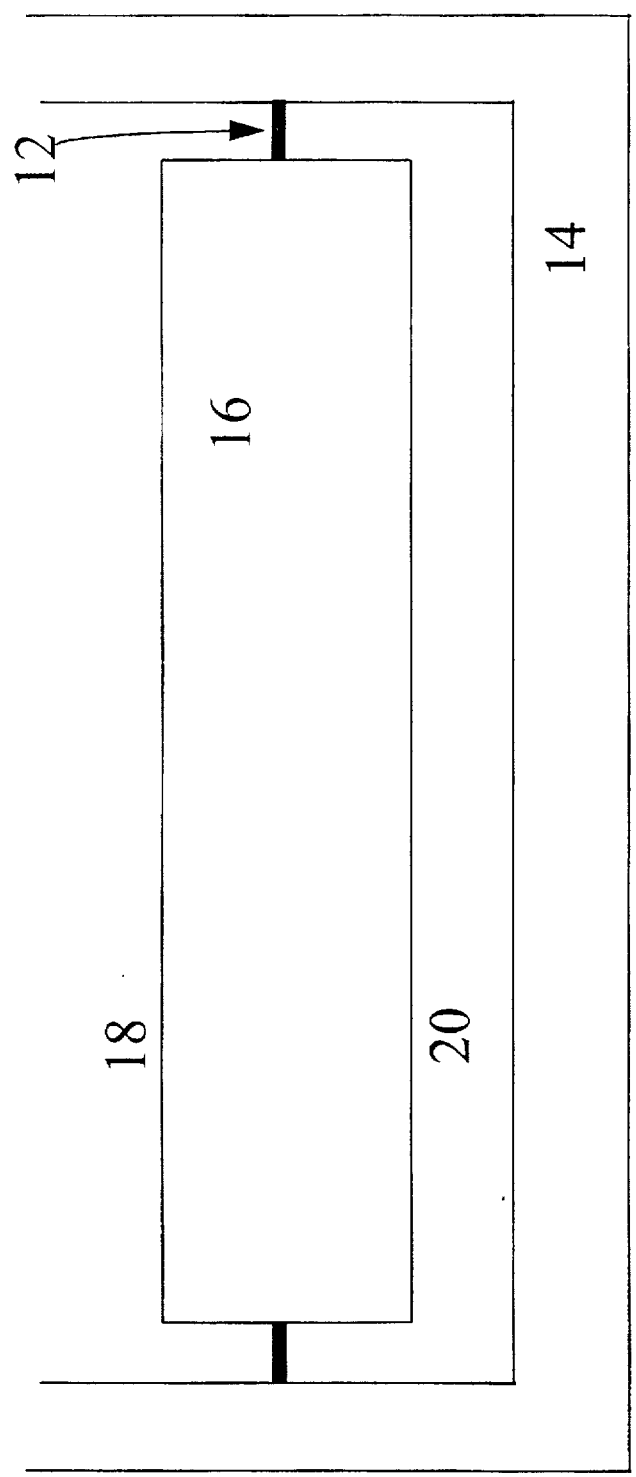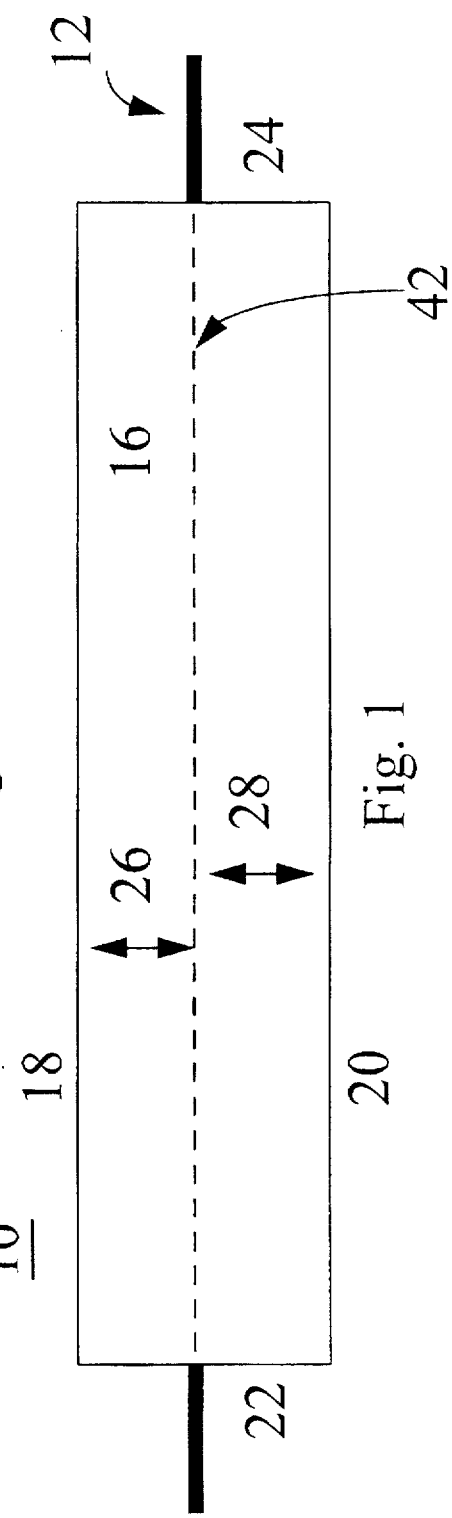

5,755,179

APPARATUS FOR PREVENTING BIRDS FROM PERCHING

BACKGROUND OF THE INVENTION.

1.1 Technical Field

This invention pertains to a method and apparatus for preventing birds from perching in a particular location. When the apparatus is mounted beneath openings to a bird feeder, birds cannot sit on the edge of the feeder, but rather are forced to feed inside the feeder from a position over a residue tray, keeping the area beneath the bird feeder clean.

1.2 Background Art

Many people enjoy attracting birds to their yards or other viewable area, by constructing feeders which contain birdseed. While it is enjoyable to watch the birds coming, feeding, and flying away, the resulting mess can be problematic. Bird excrement and dropped seed leave a mess around typical birdfeeders, with the dropped seed sometimes sprouting into unwanted weeds.

A variety of anti-perching devices have been utilized in the past. For example, U.S. Pat. No. 2,485,148 to Fralin demonstrates an anti-roosting device consisting of a pivotally mounted wire frame which will throw off a bird which attempts to land on the upper portion of the oval-shaped frame. This anti-roosting device is effective with respect to larger birds, as the frame will rotate so that the bird cannot perch on it if the bird attempts to land on the upper segment of the wire frame. However, smaller birds can fit within the upper and lower portions of the wire frame, and thus can perch on the lower segment of the wire frame, balancing and perching.

Similarly, French Patent 2507-058 teaches a rotatable frame with three rods which are intended to rotate when a bird attempts to land on one of the rods. Again, the device is useful if a bird chooses to land on a rod which is higher than the lowest rod, but it is possible for smaller birds to perch on the lower rod.

Some bird feeders known in the prior art have utilized a series of rollers to deter small animals from entering a bird feeder, and these rollers could arguably make it difficult for birds to land on the edge of the bird feeder where the multiple rollers are mounted on a rod. For example, U.S. Pat. No. 4,867,104 to Vandiver shows a bird feeder with an exterior squirrel guard consisting of multiple roller elements extending around the perimeter of the feeder. Because of the proximity to the birdseed, it is likely that these roller elements will eventually become coated with sunflower oil and other sticky substances which will cause the rollers to adhere to each other and cease rotating. Furthermore, it is possible that a bird could land on a roller and balance on it.

Similar in design to Vandiver are U.S. Pat. Nos. 5,497,585 to Engler and 5,293,721 to Richard et al. The anti-perching device in Engler consists of a series of rollers mounted on a cable, for use over a billboard. This is useful where no birdseed is expected, but will become sticky and ineffective if sunflower oil accumulates on it. The same problem would plague the Richard device, if used near birdseed. Both of these designs are also subject to increasing resistance to rotation as the cable on which the rollers are mounted looses tension over time.

Other devices are known in the prior art which are intended to keep small animals away from bird feeders. The June 1944 issue of *Popular Mechanics*, page 123, describes the use of a disk mounted on a pole to discourage chickens from roosting on top of a drinking fountain. Similarly, U.S. Pat. No. 5,207,180 to Graham claims a squirrel proof bird feeder shaped in a bell shape and topped with a "dung shield" to discourage squirrels and other small animals from stealing feed meant for birds. While all of these designs are useful for their intended purpose, they cannot be used to consistently prevent birds from roosting along the perimeter of a bird feeder.

The method and device for preventing birds from perching in a particular location which is described herein could be used effectively in a number of settings. For example, the device could be mounted above billboards or on window ledges of buildings, to prevent birds from perching and leaving behind an unsightly mess. The anti-perching device has particular utility when used in combination with a particular bird feeder design, forcing the birds to perch above a residue tray while eating, so that any offal lands in the residue tray, rather than in the yard below. The residue tray can be easily removed for cleaning. A number of designs for removable residue trays are known in the prior art, such as shown in West German Patent No. 4021-457, Japan Patent No. 4-135431, Great Britain Patents No. 693, 139, 106,926, and 18,895, and U.S. Pat. Nos. 3,654,904, 3,919,977, and 4,974,546.

A method of consistently preventing birds from perching in a particular location is needed. Ideally, this method could be used in combination with elements of a birdfeeder to prevent birds from feeding while roosting on the edge of the feeder, but instead encouraging the birds to sit above a removable residue tray as they feed, to allow for easy clean up of resulting messes.

SUMMARY OF THE INVENTION

An object of this invention is to consistently prevent birds from perching in a particular location, such as the perimeter of a bird feeder, to minimize offal from being deposited beneath that location.

Another object of this invention is to provide for a bird feeder which contains the mess of bird excrement and dropped bird seed, so that such refuse is easily removed and discarded.

The method of preventing a bird from perching in a particular location according to the present invention involves suspending a plate on a horizontal rod or from two opposing horizontal rods, so that the plate will rotate freely around an axis defined by the single rod or by the line intersecting the two rods. The rod or rods are purposely inserted at a point along the side of the plate which is not the center of that side. As a result, the plate rotates around an axis which is not central to the plate. In this specification, the term "axis" will be consistently used to refer to a straight line extending longitudinally through a plate around which the plate can rotate, although it is understood that the axis is not through the center of the plate. As a result, the rotation of the plate around the axis is eccentric.

If a single rod is inserted through the plate, the rod is supported at each end. If two rods are inserted at either side of the plate, these rods are located along a single axis, and each of the two rods is supported at the end of that rod which is not inserted into the side of the plate. The axis defined by the rod or rods extends through the plate longitudinally, but not along the center of the plate. Therefore, a portion of the plate which extends in one direction from the axis is smaller than the portion of the plate which extends in the opposite direction from the axis. As a result, the larger portion of the plate tends to hang down from the axis. However, if a bird or other small animal attempts to sit on the plate, the off-center mounted plate will rotate under the weight of the bird or animal, throwing the bird or animal off the plate.

Unlike the anti-roosting device of the '148 patent to Fralin, the plate consists of a substantially flat surface so that a bird cannot fly between the exterior edges of the device, nor perch on the lower edge. Advantageously, the plate may be substantially rectangular shape, with the axis defined by the supporting rod or rods extending from side to side through the longest dimension of the rectangle. The plate can freely rotate eccentrically around the axis, effectively preventing birds from perching in an opening above the plate.

When the plate is made of a transparent substance such as plexiglass, it is possible for food on the inside of the bird feeder to be seen through the plate from outside the feeder, encouraging birds to fly over the plate to the location of the food. Use of a transparent plate has other advantages as well. Birds are cautious of predators, and want to be able to see whether a predator is approaching as they eat. If the plate over which the bird has flown to enter a birdfeeder is transparent, the bird can watch through the transparent plate for the approach of predators as it feeds, so it will not be afraid to remain inside the feeder because of an inability to see outside the feeder.

The anti-perching device of the instant invention can be used in a variety of situations, including outside buildings and above billboards. It is anticipated that the device will be particularly valuable when used in conjunction with a specialized birdfeeder design. The rod or dual rods on which the plate is suspended can be attached at each end to columns of the bird feeder. An opening above the rotatable plate is available through which birds can fly to access feed inside the feeder. Each such opening is ideally surrounded on each side by columns, on the bottom by the rotatable plate, and on the top by a roof to the feeder. The roof should be easily removable so that bird feed can be resupplied through a top opening. Use of such a roof has the additional advantage of keeping birdseed within the feeder dry despite inclement weather.

In a substantially cubical birdfeeder, it is contemplated that an opening above a rotatable plate could be located on each of the four sides of the feeder, or on only some of them. Each side of the feeder can either be covered to prevent access to the food from that side, or can be left open, with a rotatable plate constructed at the bottom of that opening, so that birds are forced to fly over the opening and perch inside the feeder while eating.

In such a cubical feeder, it is contemplated that the columns to which the rod or rods for each paddle are supported at each end would advantageously be located at each vertically aligned edge of the cube. However, it is understood that columns located at other locations, such as the middle of a side of the feeder, could be used to support the rods, resulting in an opening above the rotatable plate which was smaller than the whole side of the feeder.

Birdseed located in a seed tray within the feeder can be accessed as birds sit within the feeder, after flying over a rotatable plate. In this location, the birds can perch over a residue tray, which will catch any bird droppings and unused seed. Ideally, the residue tray should be removable from the feeder, such as by a sliding mechanism which allows the tray to be slid from the feeder beneath a rotatable plate, so that the residue tray can be emptied and then returned to its position beneath feeding birds.

The seed tray and residue tray can be optimally located within the feeder to minimize mess created by feeding birds.

The residue tray should be located sufficiently beneath the rotatable plates so that if a bird chooses to fly down to the residue tray to perch, the bird cannot reach over the rotatable plate and drop food outside the feeder. Similarly, it is useful to locate the seed tray sufficiently inside the perimeter of the feeder, so that a bird perching on the seed tray cannot reach over the rotatable plates and drop unused seed outside the feeder.

The novel features that are considered characteristic of the invention are set forth with particularity in the claims. The invention itself, both as to its construction and its method of operation, together with additional objects and advantages thereof, will best be understood from the description of specific embodiments which follows, when read in conjunction with the accompanying drawings.

BRIEF DESCRIPTION OF THE DRAWINGS

FIG. 1 is a front view of a device for preventing birds from perching, according to the present invention.

FIG. 2 is a front view of an anti-perching device according to the present invention, supported by rods connected to columns of a bird feeder.

DETAILED DESCRIPTION OF THE PREFERRED EMBODIMENT

Figure 3:
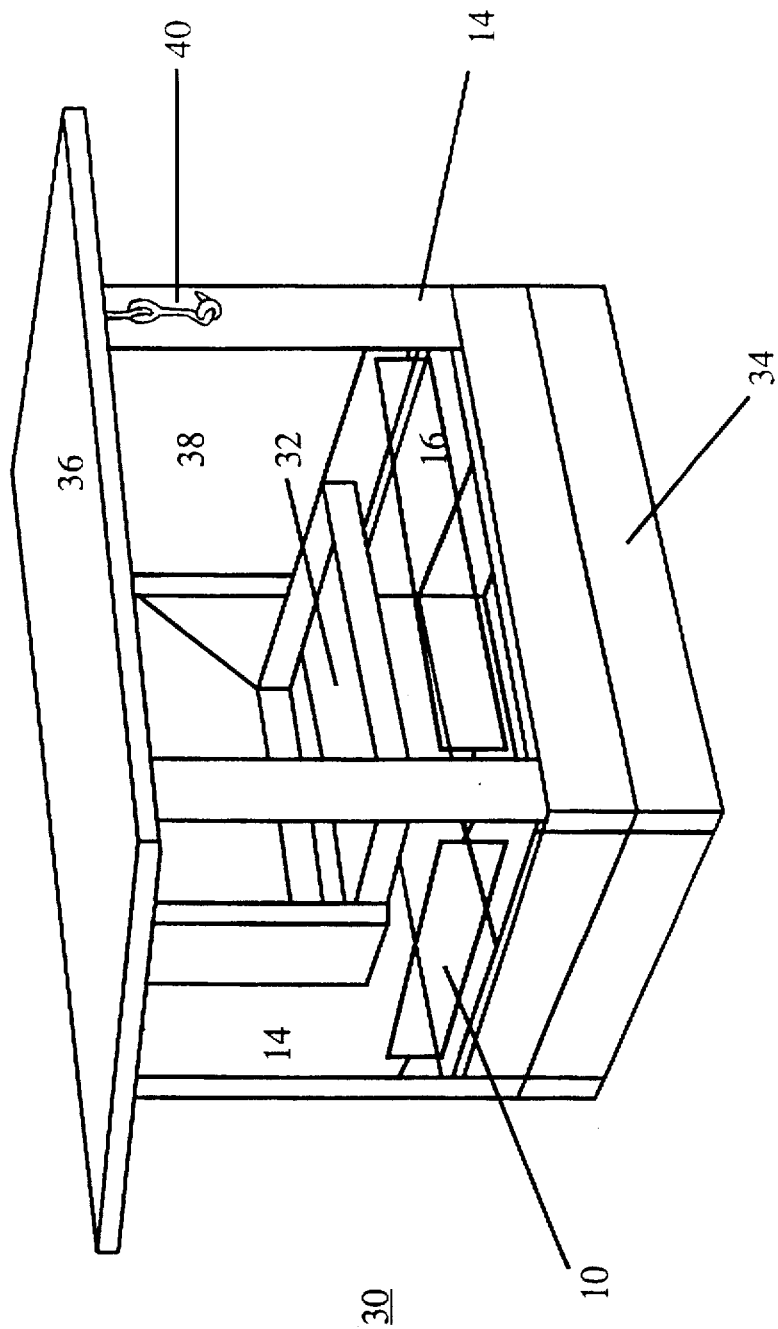
FIG. 3 is a perspective view of a bird feeder according to the present invention, including the anti-perching device claimed herein, in combination with elements of a bird feeder to prevent birds from perching to feed except in an area over a residue tray.

The present invention involves a method of preventing birds from perching in a particular location. Such a method is particularly useful when installed beneath openings to a specialized birdfeeder, as the birds can then be forced to perch above a residue tray as they feed.

In the following description, numerous specific details are set forth, in order to provide a thorough understanding of the present invention. It will be obvious, however, to one skilled in the art that the present invention may be practiced without these specific details. Some well-known methods and structure have not been set forth in order not to unnecessarily obscure the description of the present invention.

The method of preventing birds from perching of the present invention can be better understood by reference to FIG. 1. An anti-perching device 10 can be constructed by suspending a plate 16 on a single rod 12, with the rod 12 extending through the plate 16 so that the plate 16 can rotate around the rod 12. Alternatively, and also as depicted in FIG. 1, dual rods 12 can be used, with the rods 12 inserted into the sides 22 and 24 of the plate 16. In the embodiment shown in FIG. 1, the plate 16 is a flat, substantially rectangular shape, with the longest dimension, from side 22 to opposite side 24, extending along an axis 42. Axis 42 is a line formed by a single rod 12 inserted through the plate 16, or is a line of intersection of dual rods 12. In either case, the plate 16 can rotate freely around the axis 42. The rod 12 or dual rods 12 are purposely located so that the axis 42 is not centrally located within the plate 16. Thus, the plate 16 rotates eccentrically.

Because the axis 42 defined by a single rod 12 or dual rods 12 extends through the plate 16 in a non-central position, the top of the plate 18 is closer to the axis 42 than the bottom of the plate 20. Obviously, as the plate 16 rotates around the axis 42, the top of the plate 18 will at times be lower than the bottom 20, but the lengthwise side of the plate 18 which is closest to the axis 42 will be consistently referred to herein as the "top" regardless of its orientation with respect to the bottom 20, it being understood that these lengthwise sides are distinct and opposite from each other, while they may rotate around the axis 42.

The distance 26 between the top 18 and the axis 42 is smaller than the corresponding distance 28 between the bottom 20 of the plate 16 and the axis 42. As a result, when the plate 16 is undisturbed, the top 18 will tend to orient itself above the bottom 20. However, if a bird or other small animal attempts to land on the plate 16, by grasping hold of the top 18, the plate 16 will rotate under the added weight, causing the top 18 to move from its resting position shown in FIG. 1. As a result, the bird or other animal will loose its balance and be thrown from the anti-perching device 10.

As shown in FIG. 2, a single rod 12 inserted through the plate 16 or dual rods 12 inserted into the sides of the plate 16 may be supported at each end by supports 14, such as columns of a bird feeder 30. FIG. 3 shows such a bird feeder 30, with each anti-perching device 10 supported by columns 14. In two locations shown in FIG. 3, the columns 14 comprise a vertical column such as a two-by-four, while the vertical supports 14 at the back of the shown feeder 30 comprise a flat piece extending the entire back of the feeder 30, such as a piece of plywood covering the entire back opening of the feeder 30.

Inside the bird feeder 30 shown in FIG. 3, a seed tray 32 holds birdseed from which birds can feed. Birds can access the seed tray 32 only by flying through an opening 38. There may be numerous openings 38 through which the birds can fly to get to the seed tray 32, but each such opening ideally is located above an anti-perching device 10. Thus, if the bird tries to land on the perimeter of the feeder 30 to feed from that location, the bird will be thrown off the plate 16, as it rotates around the axis 42.

In tests of such a birdfeeder, it has been shown that birds do typically attempt to land on the perimeter of the feeder, as this position is perceived to be safer than a location inside the feeder. However, most birds, having been thrown by the anti-perching device, will attempt again to gain access to the food, this time flying over the anti-perching device to a location insider the feeder.

The anti-perching device 10 selves an additional purpose of blocking seed from being blown outside of the bird feeder 30 by wind. Although wind may blow seed from the seed tray 32, the vertically oriented plate 16 can act as a wall through which the seed cannot be blown, resulting in such blown seed being dropped into the residue tray 34.

To prevent birds from accessing the seed tray 32 through the top of the birdfeeder 30, a roof 36 is mounted on the columns 14. Ideally, the roof 36 is easily removable to allow the seed tray 32 to be refreshed with new seed. In the embodiment shown in FIG. 3, the roof 36 is connected by hinges to the back column 14 of the feeder 30, and is latched close at the front of the feeder by a latch 40. Advantageously, such a roof 36 keeps food within the seed tray 32 from becoming wet in inclement weather.

The seed tray 32 is located above a residue tray 34, which is ideally larger in area than the seed tray 32. In this manner, any birdseed dropped by birds perching around the seed tray 32, and any bird droppings, fall to the residue tray 34. If the seed tray 32 is displaced from the perimeter of the bird feeder 30, it will be difficult for birds perching on the seed tray to drop unused seed over the plates 16 and onto the ground. Similarly, the residue tray 34 is ideally located sufficiently below the anti-perching devices 10 so that a bird perching on the residue tray cannot reach over the plates 16 to deposit unused seed outside the feeder 30. The residue tray 34 is optimally constructed to allow for easy removal and cleaning.

The invention has been described in detail with particular reference to preferred embodiments thereof. As will be apparent to those skilled in the art in the light of the accompanying disclosure, many alterations, substitutions, modifications, and variations are possible in the practice of the invention without departing from the spirit and scope of the invention.

I claim:

1. Apparatus for preventing birds from perching comprising:

(a.) a substantially horizontal rod supported at each end, and (b.) a plate supported by said rod, said plate having a top, bottom, and two sides, (c.) wherein said rod extends from one side to the other through said plate so that said plate revolves around said rod, and (d.) wherein said rod extends through said plate so that a top distance between the top of said plate and said rod is less than a bottom distance between the bottom of said plate and said rod.

2. Apparatus as set forth in claim 1, wherein said plate is transparent.

3. Apparatus as set forth in claim 1, wherein said plate is substantially rectangular in shape, with the length between the two sides being larger than the distance between the top and bottom.

4. Apparatus as set forth in claim 1, wherein said rod is supported at each end by attachment to a vertical column of a bird feeder.

5. Apparatus as set forth in claim 4, further comprising a seed tray inside said bird feeder for holding birdseed.

6. Apparatus as set forth in claim 5, further comprising a residue tray removably located beneath said seed tray.

7. Apparatus for preventing birds from perching comprising:

(a.) a plate having a top, bottom, left side, and right side, (b.) a substantially horizontal left rod inserted into said left side of said plate, (c.) a substantially horizontal right rod inserted into said right side of said plate, (d.) wherein a line intersecting said right rod and said left rod forms an axis around which said plate rotates, and (e.) wherein said axis extends through said plate at a location which is not central to said plate, so that said plate rotates eccentrically around said axis.

8. Apparatus as set forth in claim 7, wherein each of said rods is attached at one end to a vertical column of a bird feeder.

9. Apparatus as set forth in claim 8, further comprising a seed tray inside said bird feeder for holding birdseed.

10. Apparatus as set forth in claim 9, further comprising a residue tray removably located beneath said seed tray.

11. Apparatus as set forth in claim 10, wherein said residue tray is located a vertical measured distance beneath said plate wherein said vertical measured distance is larger than a distance which a bird can reach while said bird is perched on said residue tray.

12. Apparatus as set forth in claim 11, wherein said seed tray is located a horizontal measured distance from said plate wherein said horizontal measured distance is larger than a distance which a bird can reach while said bird is perched on said seed tray.

13. Apparatus for feeding birds and catching residue, comprising:
   (a.) seed tray for holding birdseed,
   (b.) residue tray removably located beneath said seed tray,
   (c.) a plurality of substantially vertical columns extending upward from said residue tray,
   (d.) a roof supported by said vertical columns covering said seed tray and said residue tray.
   (e.) at least one plate having a top, a bottom, a right side, and a left side, wherein said right side is supported by a right substantially horizontal rod and said left side is supported by a left substantially horizontal rod, said right rod and said left rod being attached to adjacent vertical columns,
   (f.) wherein a line intersecting said right rod and said left rod forms an axis around which said plate rotates, and
   (g.) wherein said axis extends through said plate at a location which is not central to said plate, so that said plate rotates eccentrically around said axis.

14. An apparatus as set forth in claim 13, wherein said seed tray has an area smaller than said residue tray, so that said residue tray extends outwardly from said seed tray.

15. An apparatus as set forth in claim 14, wherein said residue tray is located a vertical measured distance beneath said plate wherein said vertical measured distance is larger than a distance which a bird can reach while said bird is perched on said residue tray.

16. An apparatus as set forth in claim 15, wherein said seed tray is located a horizontal measured distance from said plate wherein said horizontal measured distance is larger than a distance which a bird can reach while said bird is perched on said seed tray.

17. Apparatus for feeding birds and catching residue, comprising:
   (a.) seed tray for holding birdseed,
   (b.) residue tray removably located beneath said seed tray, wherein said residue tray has an area larger than seed tray, so that said residue tray extends outwardly from said seed tray,
   (c.) a plurality of substantially vertical columns extending upward from said residue tray, and
   (d.) a roof supported by said vertical columns covering said seed tray and said residue tray,
   (e.) wherein each opening through which birds can fly to reach said seed tray is above a plate having a top, bottom, and two sides, each side being supported by a substantially horizontal rod attached to adjacent vertical columns,
   (g.) wherein a line intersecting said right rod and said left rod forms an axis around which said plate rotates, and
   (g.) wherein said axis extends through said plate at a location which is not central to said plate, so that said plate rotates eccentrically around said axis.

* * * * *